US012606650B2

(12) United States Patent
Kim et al.

(10) Patent No.: US 12,606,650 B2
(45) Date of Patent: Apr. 21, 2026

(54) CURABLE COMPOSITION, CURED FILM MANUFACTURED USING COMPOSITION, COLOR FILTER INCLUDING CURED FILM, AND DISPLAY DEVICE INCLUDING COLOR FILTER

(71) Applicant: SAMSUNG SDI CO., LTD., Yongin-si (KR)

(72) Inventors: Jonggi Kim, Suwon-si (KR); Kyunghee Kang, Suwon-si (KR); Yonghee Kang, Suwon-si (KR); Dongjun Kim, Suwon-si (KR); Lee June Kim, Suwon-si (KR); Onyou Park, Suwon-si (KR); Bumjin Lee, Suwon-si (KR); Injae Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 183 days.

(21) Appl. No.: 18/256,630

(22) PCT Filed: Jan. 18, 2022

(86) PCT No.: PCT/KR2022/000862

§ 371 (c)(1),
(2) Date: Jun. 8, 2023

(87) PCT Pub. No.: WO2022/164106

PCT Pub. Date: Aug. 4, 2022

(65) Prior Publication Data

US 2024/0124623 A1 Apr. 18, 2024

(30) Foreign Application Priority Data

Jan. 27, 2021 (KR) ........................ 10-2021-0011895

(51) Int. Cl.
*C08F 22/14* (2006.01)
*C08F 22/20* (2006.01)

(52) U.S. Cl.
CPC .............. *C08F 22/14* (2013.01); *C08F 22/20* (2013.01)

(58) Field of Classification Search
CPC ........ C08F 22/14; C08F 22/20; C08F 220/18; B82Y 20/00; C08K 11/025; G02F 1/017; G02F 1/133514; G02F 2001/01791
See application file for complete search history.

(56) References Cited

U.S. PATENT DOCUMENTS

| | | | | |
|---|---|---|---|---|
| 10,804,417 | B2 | 10/2020 | Pschenitzka et al. | |
| 2020/0231871 | A1* | 7/2020 | Kim | C08F 2/40 |
| 2020/0248068 | A1* | 8/2020 | Choi | G02F 1/017 |
| 2020/0369954 | A1 | 11/2020 | Qiu et al. | |
| 2024/0027906 | A1 | 1/2024 | Youn et al. | |
| 2024/0084194 | A1 | 3/2024 | Choi et al. | |

FOREIGN PATENT DOCUMENTS

| | | | | | |
|---|---|---|---|---|---|
| CN | 101462973 | A | | 6/2009 | |
| CN | 111183193 | A | | 5/2020 | |
| CN | 111454711 | A | | 7/2020 | |
| JP | 2007-262378 | A | | 10/2007 | |
| JP | 2012-189888 | A | | 10/2012 | |
| JP | 2015-025087 | A | | 2/2015 | |
| JP | 2020-126234 | A | | 8/2020 | |
| JP | 2020-530133 | A | | 10/2020 | |
| KR | 10-2008-0104387 | A | | 12/2008 | |
| KR | 10-2013-0061382 | A | | 6/2013 | |
| KR | 10-2016-0103792 | A | | 9/2016 | |
| KR | 10-2017-0060400 | A | | 6/2017 | |
| KR | 10-2018-0127450 | A | | 11/2018 | |
| KR | 10-2019-0047573 | A | | 5/2019 | |
| KR | 10-2020-0073157 | A | | 6/2020 | |
| KR | 10-2020-0090493 | A | | 7/2020 | |
| KR | 10-2020-0095988 | A | | 8/2020 | |
| KR | 10-2020-0105052 | A | | 9/2020 | |
| KR | 10-2153632 | B1 | | 9/2020 | |
| KR | 2020111515 | A | * | 9/2020 | C09D 11/107 |
| KR | 10-2021-0023019 | A | | 3/2021 | |
| TW | 202028418 | A | | 8/2020 | |
| TW | 202035579 | A | | 10/2020 | |
| WO | WO 2017-180333 | A1 | | 10/2017 | |
| WO | WO 2018-071308 | A1 | | 4/2018 | |

OTHER PUBLICATIONS

International Search Report of PCT/KR2022/000862, May 4, 2022, 4 pp.

* cited by examiner

*Primary Examiner* — Bijan Ahvazi
(74) *Attorney, Agent, or Firm* — Womble Bond Dickinson (US) LLP

(57) ABSTRACT

Disclosed are a curable composition, a cured layer manufactured using the curable composition, a color filter including the cured layer, and a display device including the color filter. The curable composition includes (A) quantum dots; and (B) a curable monomer having a viscosity of less than 6.2 cps and a vapor pressure of $1\times10^{-6}$ torr to $3\times10^{-3}$ torr.

20 Claims, No Drawings

CURABLE COMPOSITION, CURED FILM MANUFACTURED USING COMPOSITION, COLOR FILTER INCLUDING CURED FILM, AND DISPLAY DEVICE INCLUDING COLOR FILTER

CROSS-REFERENCE TO RELATED APPLICATIONS

This application is a U.S. National Phase Patent Application of International Application Number PCT/KR2022/000862, filed on Jan. 18, 2022, which claims priority to Korean Patent Application Number 10-2021-0011895, filed on Jan. 27, 2021, the entire content of each of which is incorporated herein by reference.

TECHNICAL FIELD

This disclosure relates to a curable composition, a cured layer manufactured using the composition, a color filter including the cured layer, and a display device including the color filter.

BACKGROUND ART

In the case of general quantum dots, due to surface characteristics having hydrophobicity, a solvent in which it is dispersed is limited, and thus, it is difficult to introduce into a polar system such as a binder or a curable monomer.

For example, even in the case of a quantum dot ink composition being actively researched, a polarity is relatively low in an initial step and it may be dispersed in a solvent used in a curable composition having a high hydrophobicity. Therefore, because 20 wt % or more of quantum dots are difficult to be included based on the total amount of the composition, it is impossible to increase photoefficiency of the ink over a certain level. Even though the quantum dots are additionally added and dispersed in order to increase photoefficiency, a viscosity exceeds a range capable of ink-jetting and thus processability may not be satisfied.

In order to achieve the viscosity range capable of ink-jetting, a method of lowering an ink solid content by dissolving 50 wt % or more of a solvent based on the total amount of the composition, which also provides a somewhat satisfactory result in terms of viscosity. However, it may be considered to be a satisfactory result in terms of a viscosity, but nozzle drying due to solvent volatilization and nozzle clogging during ink-jetting, and reduction of a single layer thickness as time passed after ink-jetting may become worse and it is difficult to control a thickness deviation after curing. Thus, it is difficult to apply it to actual processes.

Therefore, a quantum dot ink that does not include a solvent is the most desirable form to be applied to an actual process. The current technique of applying a quantum dot itself to a solvent type composition is now limited to a certain extent.

In the case of a solvent-free curable composition (quantum dot ink composition), since an excessive amount of polymerizable compound is included, clogging and ejection failure by nozzle drying due to volatility, and single film thickness reduction due to volatilization of the ink composition jetted in the patterned partition wall pixel may be caused. Therefore, it is desirable to lower the viscosity of the solvent-free curable composition as much as possible. Accordingly, efforts to lower the viscosity of the solvent-free curable composition by modifying a structure of the polymerizable compound such as increasing a molecular weight of the polymerizable monomer, introducing a chemical structure including a hydroxy group thereinto, or the like have been made. However, since a solvent-free curable composition having as low viscosity as desired has not been developed yet, one of the problems so far is there is no choice but to provide a curable composition with insufficient ink-jetting properties.

DISCLOSURE

Technical Problem

An embodiment provides a curable composition having a low viscosity and low volatility, so that a film residue ratio after ink-jetting the pixel is also high.

Another embodiment provides a cured layer manufactured using the curable composition.

Another embodiment provides a color filter including the cured layer.

Another embodiment provides a display device including the color filter.

Technical Solution

An embodiment provides a curable composition including (A) quantum dots; and (B) a curable monomer having a viscosity of less than 6.2 cps and a vapor pressure of $1\times10^{-6}$ torr to $3\times10^{-3}$ torr.

The curable monomer may have a viscosity of greater than or equal to 3 cps and less than 6.2 cps.

The curable monomer may have an asymmetric structure.

The curable monomer may be represented by Chemical Formula 1.

[Chemical Formula 1]

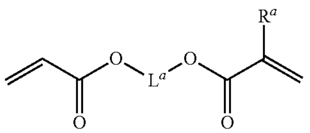

In Chemical Formula 1, $R^a$ is a substituted or unsubstituted C1 to C20 alkyl group, and $L^a$ is an unsubstituted C1 to C8 alkylene group, a substituted or unsubstituted C3 to C6 cycloalkylene group, or a linking group represented by Chemical Formula 2,

[Chemical Formula 2]

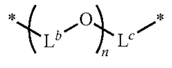

wherein, in Chemical Formula 2, $L^b$ and $L^c$ are each independently a substituted or unsubstituted C1 to C8 alkylene group, and n is an integer of 1 to 3.

In Chemical Formula 1, $L^1$ may be an unsubstituted C1 to C8 alkylene group, an unsubstituted C3 to C6 cycloalkylene group, or a linking group represented by Chemical Formula 2.

In Chemical Formula 2, $L^2$ and $L^3$ may each independently be an unsubstituted C1 to C6 alkylene group.

The curable monomer may be represented by any one of Chemical Formula 1-1 to Chemical Formula 1-9.

[Chemical Formula 1-1]

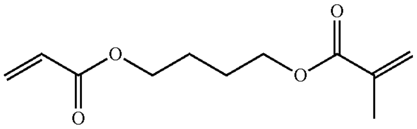

[Chemical Formula 1-2]

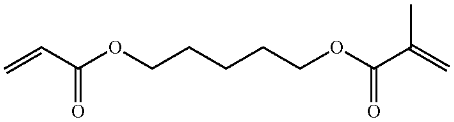

[Chemical Formula 1-3]

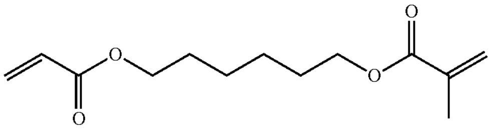

[Chemical Formula 1-4]

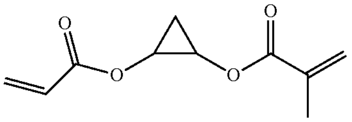

[Chemical Formula 1-5]

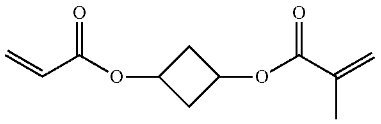

[Chemical Formula 1-6]

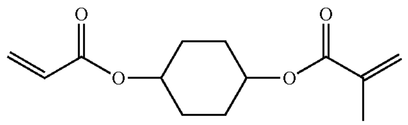

[Chemical Formula 1-7]

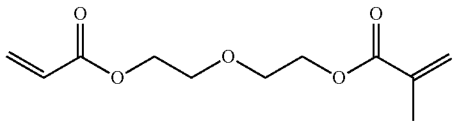

[Chemical Formula 1-8]

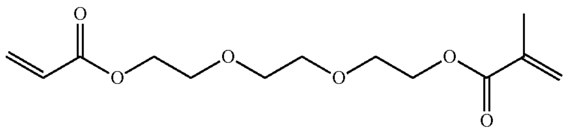

[Chemical Formula 1-9]

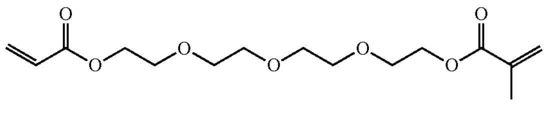

The quantum dot may be a quantum dot surface-modified with a ligand having a polar group.

The ligand having the polar group may be represented by any one of Chemical Formula 3 to Chemical Formula 16.

[Chemical Formula 3]

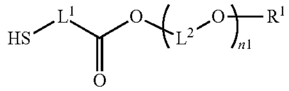

[Chemical Formula 4]

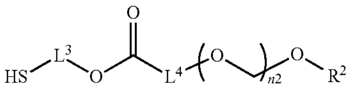

[Chemical Formula 5]

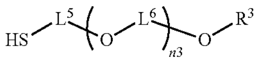

[Chemical Formula 6]

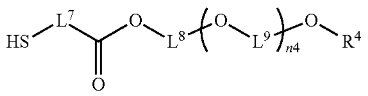

[Chemical Formula 7]

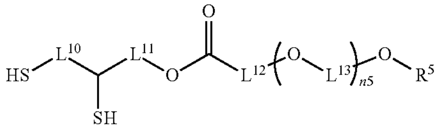

[Chemical Formula 8]

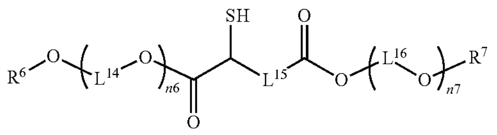

In Chemical Formula 3 to Chemical Formula 8, $R^1$ to $R^7$ are each independently a substituted or unsubstituted C1 to C10 alkyl group or a substituted or unsubstituted C6 to C20 aryl group, $L^1$ to $L^{16}$ are each independently a substituted or unsubstituted C1 to C10 alkylene group, and n1 to n7 are each independently an integer of 0 to 10,

[Chemical Formula 9]

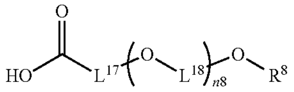

[Chemical Formula 10]

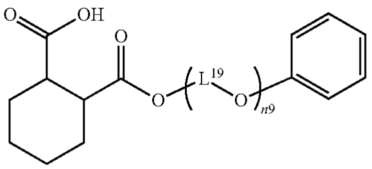

[Chemical Formula 11]

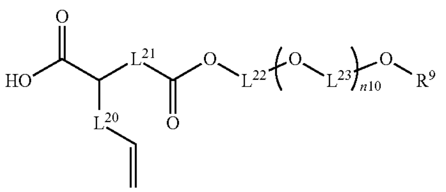

wherein, in Chemical Formula 9 to Chemical Formula 11, $R^8$ and $R^9$ are each independently a substituted or unsubstituted C1 to C10 alkyl group, $L^{17}$ to $L^{23}$ are each independently a substituted or unsubstituted C1 to C10 alkylene group, and n8 to n10 are each independently an integer of 0 to 10,

[Chemical Formula 12]

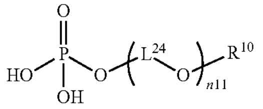

[Chemical Formula 13]

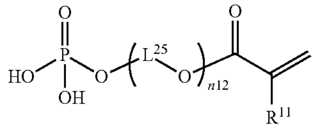

[Chemical Formula 14]

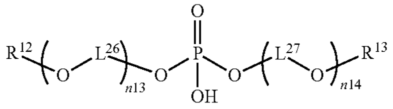

[Chemical Formula 15]

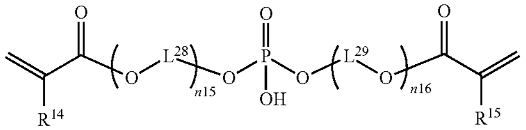

wherein, in Chemical Formula 12 to Chemical Formula 15, $R^{10}$ to $R^{15}$ are each independently a hydrogen atom or a substituted or unsubstituted C1 to C10 alkyl group, $L^{24}$ to $L^{29}$ are each independently a substituted or unsubstituted C1 to C10 alkylene group, and n11 to n16 are each independently an integer of 0 to 10,

[Chemical Formula 16]

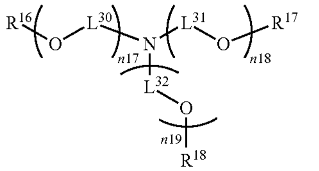

wherein, in Chemical Formula 16, $R^{16}$ to $R^{18}$ are each independently a substituted or unsubstituted C1 to C10 alkyl group, $L^{30}$ to $L^{32}$ are each independently a substituted or unsubstituted C1 to C10 alkylene group, and n17 to n19 are each independently an integer of 0 to 10.

The curable composition may be a solvent-free curable composition.

The solvent-free curable composition may include 5 wt % to 60 wt % of the quantum dots; and 40 wt % to 95 wt % of the polymerizable compound based on the total amount of the solvent-free curable composition.

The curable composition may further include a polymerization initiator, a light diffusing agent, a polymerization inhibitor, or a combination thereof.

The light diffusing agent may include barium sulfate, calcium carbonate, titanium dioxide, zirconia, or a combination thereof.

The curable composition may further include a solvent.

The curable composition including the solvent may include 1 wt % to 40 wt % of the quantum dots; 1 wt % to 20 wt % of the polymerizable compound; and 40 wt % to 80 wt % of the solvent based on the total weight of the curable composition.

The curable composition may further include malonic acid; 3-amino-1,2-propanediol; a silane-based coupling agent; a leveling agent; a fluorine-based surfactant; or a combination thereof.

Another embodiment provides a cured layer manufactured by using the curable composition.

Another embodiment provides a color filter including the cured layer.

Another embodiment provides a display device including the color filter.

Other embodiments of the present invention are included in the following detailed description.

Advantageous Effects

In order to effectively lower viscosity of the quantum dot-containing curable composition, a quantum dot-containing curable composition having low viscosity and low volatility may be provided by controlling the viscosity and the vapor pressure of the curable monomer to specific ranges and specifically, using a curable monomer with an asymmetric structure to secure the control of the viscosity and the vapor pressure of the curable monomer to the specific ranges.

Best Mode

Hereinafter, embodiments of the present invention are described in detail. However, these embodiments are exemplary, the present invention is not limited thereto and the present invention is defined by the scope of claims.

As used herein, when specific definition is not otherwise provided, "alkyl group" refers to a C1 to C20 alkyl group, "alkenyl group" refers to a C2 to C20 alkenyl group, "cycloalkenyl group" refers to a C3 to C20 cycloalkenyl group, "heterocycloalkenyl group" refers to a C3 to C20 heterocycloalkenyl group, "aryl group" refers to a C6 to C20 aryl group, "arylalkyl group" refers to a C6 to C20 arylalkyl group, "alkylene group" refers to a C1 to C20 alkylene group, "arylene group" refers to a C6 to C20 arylene group, "alkylarylene group" refers to a C6 to C20 alkylarylene group, "heteroarylene group" refers to a C3 to C20 heteroarylene group, and "alkoxylene group" refers to a C1 to C20 alkoxylene group.

As used herein, when specific definition is not otherwise provided, "substituted" refers to replacement of at least one hydrogen atom by a substituent selected from a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

As used herein, when specific definition is not otherwise provided, "hetero" refers to inclusion of at least one heteroatom of N, O, S, and P, in the chemical formula.

As used herein, when specific definition is not otherwise provided, "(meth)acrylate" refers to both "acrylate" and "methacrylate", and "(meth)acrylic acid" refers to "acrylic acid" and "methacrylic acid."

As used herein, when specific definition is not otherwise provided, the term "combination" refers to mixing or copolymerization.

In the present specification, when a definition is not otherwise provided, hydrogen is bonded at the position when a chemical bond is not drawn in chemical formula where supposed to be given.

In addition, in the present specification, when a definition is not otherwise provided, "*" refers to a linking point with the same or different atom or chemical formula.

The present invention is to effectively lower the viscosity of the quantum dot-containing curable composition, by changing one functional group into a methacrylate group to transform a symmetric structure of a conventional diacrylate-based curable monomer into an asymmetric structure, so that a curable monomer with this asymmetric structure may have low viscosity and a low vapor pressure, and thus the quantum dot-containing curable composition including the same may have low viscosity, compared with other compositions, and also, low volatility, compared with the other compositions with similar viscosity and accordingly, exhibit no significantly deteriorated film residue ratio as time goes over after ink-jetted in a pixel, realizing excellent color filter and display device.

In general, a diacrylate-based curable monomer has an advantage of lowering viscosity by adjusting a molecular weight and the like but a drawback of not rapidly lowering a vapor pressure, even though its chemical structure is modified.

In addition, a dimethacrylate-based curable monomer has a little inferior curing property to that of the diacrylate-based curable monomer but a low vapor pressure. Accordingly, there has been an attempt to prepare a quantum dot-containing curable composition by mixing the diacrylate-based curable monomer and the dimethacrylate-based curable monomer, but since these two curable monomers have no interaction or azotropic effects after ink-jetted in a pixel, there is a problem that each curable monomer is separately volatilized according to its own vapor pressure.

Accordingly, the present inventors have confirmed through repeated studies that the viscosity and vapor pressure of a curable monomer to specific ranges may be controlled by configuring the acrylate group and the methacrylate group to asymmetrically coexist together in one chemical monomer structure (one body) and also, confirmed that a quantum dot-containing curable composition including this curable monomer has lower viscosity and volatility than the conventional composition, completing the present invention.

Hereinafter, each component constituting the curable composition according to an embodiment is described in detail.

Curable Monomer

In order to improve ink-jetting properties and thus secure a smooth ink-jetting process, a curable monomer with a low vapor pressure and low viscosity needs to be applied. However, the curable monomer in general has a structure of having a carbon-carbon double bond at at least either one of both terminal ends, which brings about trade-off relationship between vapor pressure and viscosity each other and thus puts many restrictions.

Accordingly, conventional research and developments are focused on finding an optimal combination of curable monomers with different viscosities and vapor pressures, but the present inventors took a different direction therefrom, that is, used one curable monomer but structurally modified it to have an asymmetric structure and thus obtain a single curable monomer with low viscosity and a low vapor pressure, that is, a curable monomer with viscosity of less than about 6.2 cps and a vapor pressure of about $1\times10^{-6}$ torr to about $3\times10^{-3}$ torr, so that a quantum dot-containing curable composition including the same may also have low viscosity and low volatility, compared with other compositions with similar viscosity, and exhibit no significantly deteriorated film residue ratio after ink-jetted in a pixel and thus provide a cured filim with excellent patternability and the like.

Specifically, an embodiment provides a curable composition including (A) quantum dots; and (B) a curable monomer having a viscosity of less than 6.2 cps and a vapor pressure of $1\times10^{-6}$ torr to $3\times10^{-3}$ torr.

For example, the curable monomer may have a viscosity of greater than or equal to 3 cps and less than 6.2 cps.

The curable monomer may have an asymmetric structure, and thus a single curable monomer may have a low viscosity and low vapor pressure. For example, a diacrylate-based curable monomer or a dimethacrylate-based curable monomer having a symmetric structure rather than an asymmetric structure has a high vapor pressure when the viscosity is low, or a high viscosity when the vapor pressure is low and thus cannot be used as a curable monomer used in the composition.

Specifically, the curable monomer, more specifically, the curable monomer having the asymmetric structure may be represented by Chemical Formula 1.

[Chemical Formula 1]

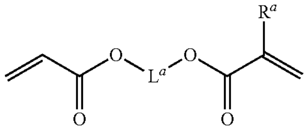

In Chemical Formula 1, $R^a$ is a substituted or unsubstituted C1 to C20 alkyl group, and $L^a$ is an unsubstituted C1 to C8 alkylene group, a substituted or unsubstituted C3 to C6 cycloalkylene group, or a linking group represented by Chemical Formula 2,

[Chemical Formula 2]

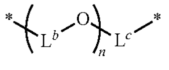

wherein, in Chemical Formula 2, $L^b$ and $L^c$ are each independently a substituted or unsubstituted C1 to C8 alkylene group, and n is an integer of 1 to 3.

As the curable monomer of the asymmetric structure has a structure in which an intermediate linking group between an acrylate group at one terminal end and a methacrylate group at the other terminal end is unsubstituted or has a shorter length, the viscosity and vapor pressure of the curable monomer may be simultaneously lowered. That is, in order to obtain a curable monomer having a low both viscosity and vapor pressure, specifically a viscosity of less than 6.2 cps and a vapor pressure of $1\times10^{-4}$ torr to $3\times10^{-3}$ torr, a structure of an intermediate linking group (the presence and length of substituents, etc.) as well as an asymmetric structure should also be considered to be important.

For example, in Chemical Formula 1, $L^1$ may be an unsubstituted C1 to C8 alkylene group, an unsubstituted C3 to C6 cycloalkylene group, or a linking group represented by Chemical Formula 2.

For example, in Chemical Formula 2, $L^2$ and $L^3$ may each independently represent an unsubstituted C1 to C6 alkylene group.

For example, the curable monomer may be represented by any one of Chemical Formula 1-1 to Chemical Formula 1-9, but is not necessarily limited thereto.

[Chemical Formula 1-1]

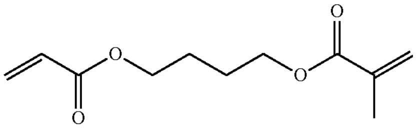

[Chemical Formula 1-2]

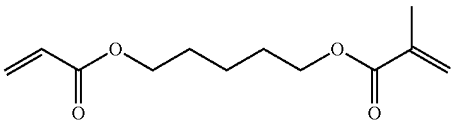

[Chemical Formula 1-3]

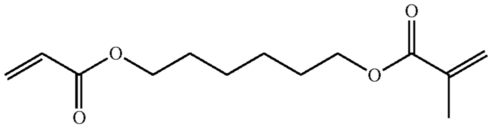

[Chemical Formula 1-4]

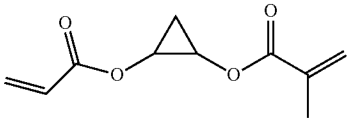

[Chemical Formula 1-5]

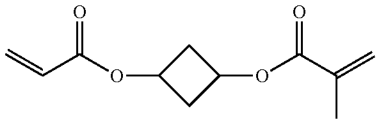

[Chemical Formula 1-6]

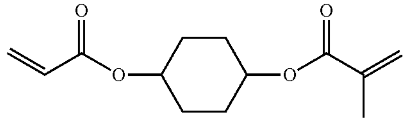

[Chemical Formula 1-7]

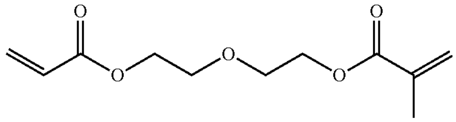

[Chemical Formula 1-8]

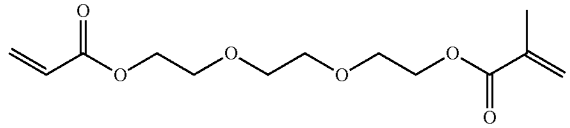

-continued

[Chemical Formula 1-9]

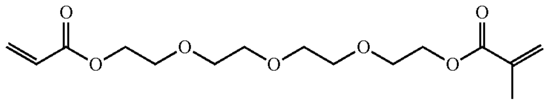

When the curable composition according to an embodiment is a solvent-free curable composition, the curable monomer may be included in an amount of 40 wt % to 95 wt %, for example 40 wt % to 85 wt %, for example 40 wt % to 80 wt % based on the total amount of the solvent-free curable composition. When the amount of the curable monomer is within the above range, a solvent-free curable composition having a low viscosity capable of ink-jetting, for example, a viscosity of 10 cPs to 30 cPs may be prepared, and the solvent-free curable composition has lower volatility than other quantum dot-containing curable compositions having the same viscosity. In addition, quantum dots in the prepared solvent-free curable composition may have excellent dispersibility, and optical properties may also be improved.

In addition, when the curable composition includes a solvent, the curable monomer may be included in an amount of 1 wt % to 15 wt %, for example 5 wt % to 15 wt %, based on the total amount of the curable composition. When the curable monomer is included within the above range, optical properties of the quantum dots may be improved.

For example, the curable monomer may have a molecular weight of 100 g/mol to 800 g/mol. When the molecular weight of the curable monomer is within the above range, it may be advantageous for ink-jetting because it does not increase the viscosity of the composition without impairing the optical properties of the quantum dots.

In addition, the curable composition according to an embodiment may further include a monomer generally used in a conventional thermosetting or photocurable composition (e.g., bis[1-ethyl (3-oxetanyl)]methyl ether, and the like oxetane-based compound, etc.) together with the curable monomer.

Quantum Dots

The quantum dots in the curable composition according to an embodiment may be a quantum dot surface-modified with a ligand having a polar group, for example, a ligand having high affinity with the polymerizable compound. In the case of the surface-modified quantum dots as described above, it is very easy to prepare a high-concentration or highly-concentrated quantum dot dispersion (improving the dispersibility of the quantum dots in the polymerizable monomer), which can have a great effect on improving the photoefficiency and particularly, may be advantageous to implement a solvent-free curable composition.

For example, the ligand having the polar group may have a structure having high affinity with the chemical structure of the polymerizable compound.

For example, the ligand having a polar group may be represented by any one of Chemical Formula 3 to Chemical Formula 16, but is not necessarily limited thereto.

[Chemical Formula 3]

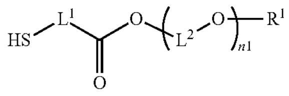

-continued

[Chemical Formula 4]

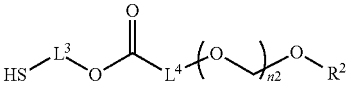

[Chemical Formula 5]

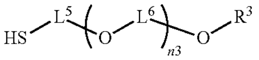

[Chemical Formula 6]

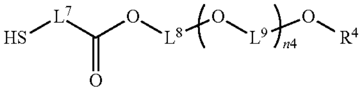

[Chemical Formula 7]

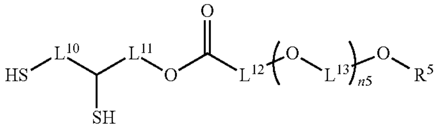

[Chemical Formula 8]

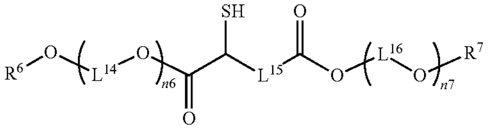

In Chemical Formula 3 to Chemical Formula 8, $R^1$ to $R^7$ are each independently a substituted or unsubstituted C1 to C10 alkyl group or a substituted or unsubstituted C6 to C20 aryl group, $L^1$ to $L^{16}$ are each independently a substituted or unsubstituted C1 to C10 alkylene group, and n1 to n7 are each independently an integer of 0 to 10.

[Chemical Formula 9]

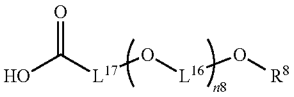

[Chemical Formula 10]

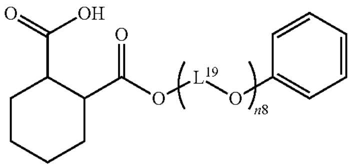

[Chemical Formula 11]

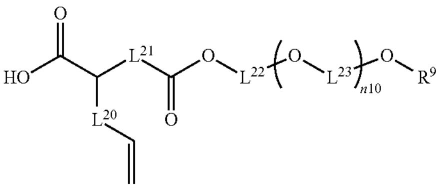

In Chemical Formula 9 to Chemical Formula 11, $R^8$ and $R^9$ are each independently a substituted or unsubstituted C1 to C10 alkyl group, $L^{17}$ to $L^{23}$ are each independently a substituted or unsubstituted C1 to C10 alkylene group, and n8 to n10 are each independently an integer of 0 to 10.

[Chemical Formula 12]

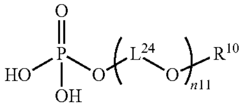

[Chemical Formula 13]

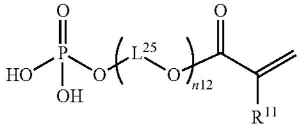

[Chemical Formula 14]

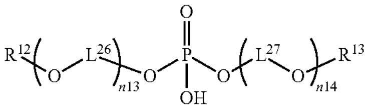

[Chemical Formula 15]

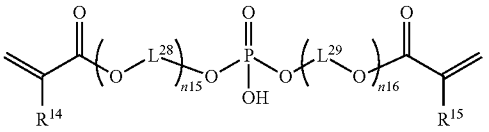

In Chemical Formula 12 to Chemical Formula 15, $R^{10}$ to $R^{15}$ are each independently a hydrogen atom or a substituted or unsubstituted C1 to C10 alkyl group, $L^{24}$ to $L^{29}$ are each independently a substituted or unsubstituted C1 to C10 alkylene group, and n11 to n16 are each independently an integer of 0 to 10.

[Chemical Formula 16]

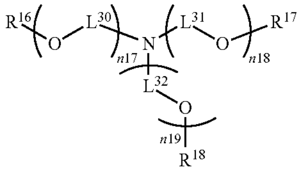

In Chemical Formula 16, $R^{16}$ to $R^{18}$ are each independently a substituted or unsubstituted C1 to C10 alkyl group, $L^{30}$ to $L^{32}$ are each independently a substituted or unsubstituted C1 to C10 alkylene group, and n17 to n19 are each independently an integer of 0 to 10.

For example, the compound represented by Chemical Formula 3 to Chemical Formula 16 may be any one of the compounds represented by Chemical Formula A to Chemical Formula Q, but is not necessarily limited thereto.

[Chemical Formula A]

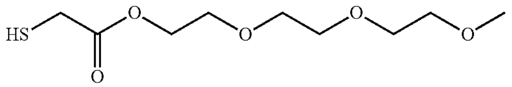

-continued
[Chemical Formula B]
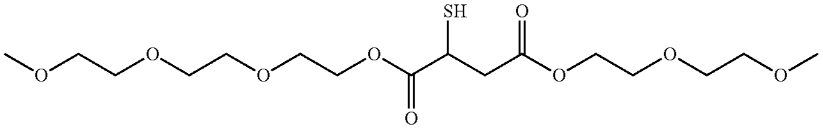
[Chemical Formula C]
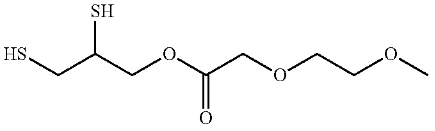
[Chemical Formula D]
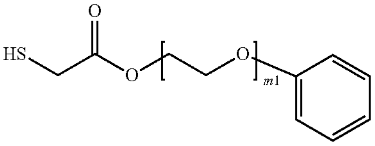
(In Chemical Formula D, m1 is an integer of 0 to 10.)
[Chemical Formula E]
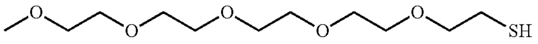
[Chemical Formula F]
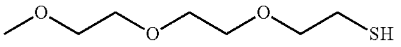
[Chemical Formula G]
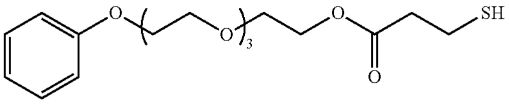
[Chemical Formula H]
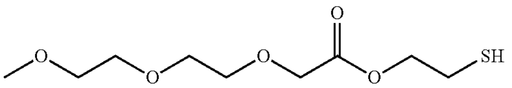
[Chemical Formula I]
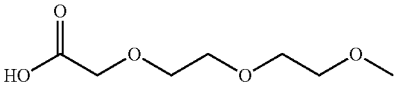
[Chemical Formula J]
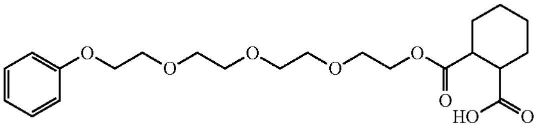
[Chemical Formula K]
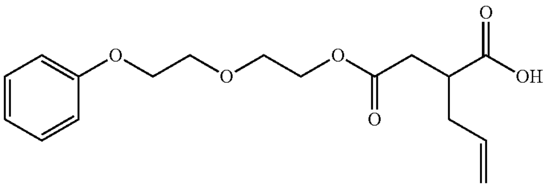
[Chemical Formula L]
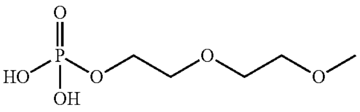
[Chemical Formula M]
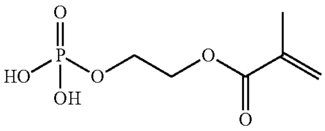
[Chemical Formula N]
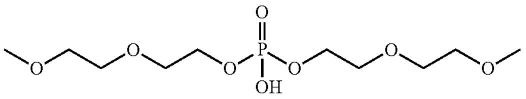
[Chemical Formula O]
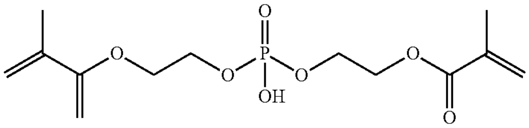
[Chemical Formula P]
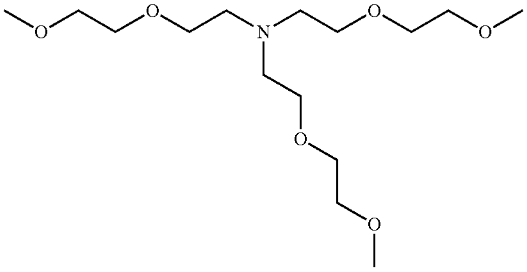
[Chemical Formula Q]
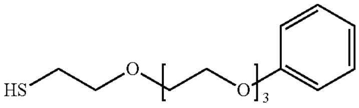

When the ligand is used, the surface modification of the quantum dots is easier, and when the quantum dots surface-modified with the ligand are added to the above-described polymerizable compound and stirred, a very transparent dispersion may be obtained, which indicates that the surface modification of the quantum dots is very good.

For example, the quantum dots may have a maximum fluorescence emission wavelength in the range of 500 nm to 680 nm.

For example, when the curable composition according to an embodiment is a solvent-free curable composition, the quantum dots may be included in an amount of 5 wt % to 60 wt %, for example 10 wt % to 60 wt %, for example 20 wt % to 60 wt %, for example 30 wt % to 50 wt %. When the quantum dots are included within the above range, high light retention rate and photoefficiency even after curing may be achieved.

For example, when the curable composition according to an embodiment is a curable composition including a solvent, the quantum dots may be included in an amount of 1 wt % to 40 wt %, for example 3 wt % to 30 wt %, based on the total amount of the curable composition. When the quantum dots are included within the above range, the light conversion rate is improved, and the pattern characteristics and developing characteristics are not impaired, and thus improved processability may be obtained.

Until now, curable compositions (inks) including quantum dots have been developed to be specialized in thiol-based binders or monomers having good compatibility with quantum dots, and furthermore, they are being commercialized.

For example, the quantum dots absorb light in a wavelength region of 360 nm to 780 nm, for example 400 nm to 780 nm and emits fluorescence in a wavelength region of 500 nm to 700 nm, for example 500 nm to 580 nm, or emits fluorescence in a wavelength region of 600 nm to 680 nm. That is, the quantum dots may have a maximum fluorescence emission wavelength (fluorescence $\lambda$em) at 500 nm to 680 nm.

The quantum dots may independently have a full width at half maximum (FWHM) of 20 nm to 100 nm, for example 20 nm to 50 nm. When the quantum dots have a full width at half maximum (FWHM) of the ranges, color reproducibility is increased when used as a color material in a color filter due to high color purity.

The quantum dots may independently be an organic material, an inorganic material, or a hybrid (mixture) of an organic material and an inorganic material.

The quantum dots may independently be composed of a core and a shell surrounding the core, and the core and the shell may independently have a structure of a core, a core/shell, a core/first shell/second shell, an alloy, an alloy/shell, or the like, which is composed of Group II-IV, Group III-V, and the like, but are not limited thereto.

For example, the core may include at least at least one material selected from CdS, CdSe, CdTe, ZnS, ZnSe, ZnTe, HgS, HgSe, HgTe, GaN, GaP, GaAs, InP, InAs, and an alloy thereof, but is not necessarily limited thereto. The shell surrounding the core may include at least at least one material selected from CdSe, ZnSe, ZnS, ZnTe, CdTe, PbS, TiO, SrSe, HgSe, and an alloy thereof, but is not necessarily limited thereto.

In an embodiment, since an interest in an environment has been recently much increased over the whole world, and a restriction of a toxic material also has been fortified, a cadmium-free light emitting material (InP/ZnS, InP/ZnSe/ZnS, etc.) having little low quantum efficiency (quantum yield) but being environmentally-friendly instead of a light emitting material having a cadmium-based core is used, but not necessarily limited thereto.

In the case of the quantum dots of the core/shell structure, an entire size including the shell (an average particle diameter) may be 1 nm to 15 nm, for example, 5 nm to 15 nm.

For example, the quantum dots may independently include red quantum dots, green quantum dots, or a combination thereof. The red quantum dots may independently have an average particle diameter of 10 nm to 15 nm. The green quantum dots may independently have an average particle diameter of 5 nm to 8 nm.

On the other hand, for the dispersion stability of the quantum dots, the curable composition according to an embodiment may further include a dispersing agent. The dispersing agent helps uniform dispersibility of light conversion materials such as quantum dots in the curable composition and may include a non-ionic, anionic, or cationic dispersing agent. Specifically, the dispersing agent may be polyalkylene glycol or esters thereof, a polyoxy alkylene, a polyhydric alcohol ester alkylene oxide addition product, an alcohol alkylene oxide addition product, a sulfonate ester, a sulfonate salt, a carboxylate ester, a carboxylate salt, an alkyl amide alkylene oxide addition product, an alkyl amine and the like, and they may be used alone or in a mixture of two or more. The dispersing agent may be used in an amount of 0.1 wt % to 100 wt %, for example 10 wt % to 20 wt % based on the solid content of the light conversion material such as quantum dots.

Light Diffusing Agent

The curable composition according to an embodiment may further include a light diffusing agent.

For example, the light diffusing agent may include barium sulfate ($BaSO_4$), calcium carbonate ($CaCO_3$), titanium dioxide ($TiO_2$), zirconia ($ZrO_2$), or a combination thereof.

The light diffusing agent may reflect unabsorbed light in the aforementioned quantum dots and allows the quantum dots to absorb the reflected light again. That is, the light diffusing agent may increase an amount of light absorbed by the quantum dots and increase light conversion efficiency of the curable composition.

The light diffusing agent may have an average particle diameter ($D_{50}$) of 150 nm to 250 nm, specifically 180 nm to 230 nm. When the average particle diameter of the light diffusing agent is within the ranges, it may have a better light diffusing effect and increase light conversion efficiency.

The light diffusing agent may be included in an amount of 1 wt % to 20 wt %, for example 2 wt % to 15 wt %, for example 3 wt % to 10 wt % based on the total amount of the curable composition. When the light diffusing agent is included in an amount of less than 1 wt % based on the total amount of the curable composition, it is difficult to expect an effect of improving the light conversion efficiency by using the light diffusing agent, and when it is included in an amount of greater than 20 wt %, the quantum dot sedimentation problem is may occur.

Polymerization Initiator

The curable composition according to an embodiment may further include a polymerization initiator, for example, a photopolymerization initiator, a thermal polymerization initiator, or a combination thereof.

The photopolymerization initiator is a generally-used initiator for a photosensitive resin composition, for example an acetophenone-based compound, a benzophenone-based compound, a thioxanthone-based compound, a benzoin-based compound, a triazine-based compound, an oxime-based compound, an aminoketone-based compound, and the like, but is not necessarily limited thereto.

Examples of the acetophenone-based compound may be 2,2'-diethoxy acetophenone, 2,2'-dibutoxy acetophenone, 2-hydroxy-2-methylpropinophenone, p-t-butyltrichloroacetophenone, p-t-butyldichloroacetophenone, 4-chloroacetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like.

Examples of the benzophenone-based compound may be benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylamino-benzophenone, 4,4'-dichlorobenzophenone, 3,3'-dimethyl-2-methoxybenzophenone, and the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and the like.

Examples of the benzoin-based compound may be benzoin, benzoin methyl ether, benzoin ethyl ether, benzoin isopropyl ether, benzoin isobutyl ether, benzyldimethylketal, and the like.

Examples of the triazine-based compound may be 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloromethyl)-s-triazine, bis(trichloromethyl)-6-styryl-s-triazine, 2-(naphthol-yl)-4,6-bis(trichloromethyl)-s-triazine, 2-(4-methoxynaphtho1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

Examples of the oxime-based compound may be O-acyloxime-based compound, 2-(O-benzoyloxime)-1-[4-(phenylthio)phenyl]-1,2-octandione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and the like. Specific examples of the O-acyloxime-based compound may be 1,2-octandione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and the like.

Examples of the aminoketone-based compound may be 2-benzyl-2-dimethylamino-1-(4-morpholinophenyl)-butanone-1, and the like.

The photopolymerization initiator may further include a carbazole-based compound, a diketone-based compound, a sulfonium borate-based compound, a diazo-based compound, an imidazole-based compound, a biimidazole-based compound, and the like, besides the compounds.

The photopolymerization initiator may be used with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and the like.

Examples of the thermal polymerization initiator may be peroxide, specifically benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, 2,2-azobis(isobutyronitrile), t-butyl perbenzoate, and the like, for example 2,2'-azobis-2-methylpropinonitrile, but are not necessarily limited thereto, and any of which is well known in the art may be used.

The polymerization initiator may be included in an amount of 0.1 wt % to 5 wt %, for example 1 wt % to 4 wt % based on the total amount of the curable composition. When the polymerization initiator is included in the ranges, it is possible to obtain excellent reliability due to sufficient curing during exposure or thermal curing and to prevent deterioration of transmittance due to non-reaction initiators, thereby preventing deterioration of optical properties of the quantum dots.

Binder Resin

The curable composition according to an embodiment may further include a binder resin.

The binder resin may include an acryl-based resin, a cardo-based resin, an epoxy resin, or a combination thereof.

The acryl-based resin may be a copolymer of a first ethylenic unsaturated monomer and a second ethylenic unsaturated monomer that is copolymerizable therewith, and may be a resin including at least one acryl-based repeating unit.

Specific examples of the acryl-based binder resin may be polybenzylmethacrylate, a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth) acrylic acid/benzylmethacrylate/styrene/2-hydroxyethylmethacrylate copolymer, and the like, but are not limited thereto, and may be used alone or as a mixture of two or more.

A weight average molecular weight of the acryl-based binder resin may be 5,000 g/mol to 15,000 g/mol. When the acryl-based binder resin has a weight average molecular weight within the ranges, close-contacting properties to a substrate, physical and chemical properties are improved, and a viscosity is appropriate.

The acryl-based resin may have an acid value of 80 mgKOH/g to 130 mgKOH/g. When the acryl-based resin has an acid value within the range, a pixel pattern may have excellent resolution.

The cardo-based resin may be used in a conventional curable resin (or photosensitive resin) composition, and may be, for example, used as disclosed in Korean Patent Application Laid-Open No. 10-2018-0067243, but is not limited thereto.

The cardo-based resin may be, for example prepared by mixing at least two of a fluorene-containing compound such as 9,9-bis(4-oxiranylmethoxyphenyl)fluorene; an anhydride compound such as benzenetetracarboxylic acid dianhydride, naphthalenetetracarboxylic acid dianhydride, biphenyltetracarboxylic acid dianhydride, benzophenonetetracarboxylic acid dianhydride, pyromellitic dianhydride, cyclobutanetetracarboxylic acid dianhydride, perylenetetracarboxylic acid dianhydride, tetrahydrofurantetracarboxylic acid dianhydride, and tetrahydrophthalic anhydride; a glycol compound such as ethylene glycol, propylene glycol, and polyethylene glycol; an alcohol compound such as methanol, ethanol, propanol, n-butanol, cyclohexanol, and benzylalcohol; a solvent-based compound such as propylene glycol methylethylacetate, and N-methylpyrrolidone; a phosphorus compound such as triphenylphosphine; and an amine or ammonium salt compound such as tetramethylammonium chloride, tetraethylammonium bromide, benzyldiethylamine, triethylamine, tributylamine, or benzyltriethylammonium chloride.

A weight average molecular weight of the cardo-based binder resin may be 500 g/mol to 50,000 g/mol, for example 1,000 g/mol to 30,000 g/mol. When the weight average molecular weight of the cardo-based binder resin is within the ranges, a satisfactory pattern may be formed without a residue during a production of a cured layer and without losing a film thickness during development of the solvent-type curable composition.

When the binder resin is a cardo-based resin, the developability of the curable composition, particularly the photosensitive resin composition, including the binder resin is improved, and the sensitivity during photocuring is good, so that the fine pattern formation property is improved.

The epoxy resin may be a monomer or oligomer that is capable of being polymerized by heat, and may include a compound having a carbon-carbon unsaturated bond and a carbon-carbon cyclic bond.

The epoxy resin may include, but is not limited to, a bisphenol A-type epoxy resin, a bisphenol F-type epoxy resin, a phenol novolac-type epoxy resin, a cyclic aliphatic epoxy resin, and an aliphatic polyglycidyl ether.

Currently available products thereof may include bisphenyl epoxy resins such as YX4000, YX4000H, YL6121H, YL6640, or YL6677 from Yuka Shell Epoxy Co., Ltd.; cresol novolac-type epoxy resins such as EOCN-102, EOCN-103S, EOCN-104S, EOCN-1020, EOCN-1025, and EOCN-1027 from Nippon Kayaku Co., Ltd. and EPIKOTE 180S75 from Yuka Shell Epoxy Co., Ltd.; bisphenol A epoxy resins such as EPIKOTE 1001, 1002, 1003, 1004, 1007, 1009, 1010, and 828 from Yuka Shell Epoxy Co., Ltd.; bisphenol F-type epoxy resins such as EPIKOTE 807 and 834 from Yuka Shell Epoxy Co., Ltd.; phenol novolac-type epoxy resins such as EPIKOTE 152, 154, and 157H65 from Yuka Shell Epoxy Co., Ltd. and EPPN 201, 202 from Nippon Kayaku Co., Ltd.; other cyclic aliphatic epoxy resins such as CY175, CY177 and CY179 from CIBA-GEIGY A. G, ERL-4234, ERL-4299, ERL-4221, and ERL-4206 from U.C.C, Shodyne 509 from Showa Denko K.K., ARALDITE CY-182, CY-192 and CY-184 from CIBA-GEIGY A. G, Epichron 200 and 400 from Dainippon Ink and Chemicals, Inc., EPIKOTE 871, 872 and EP1032H60 from Yuka Shell Epoxy Co., Ltd., ED-5661 and ED-5662 from Celanese Coatings Co., Ltd.; aliphatic polyglycidylethers such as EPIKOTE 190P and 191P from Yuka Shell Epoxy Co., Ltd., Epolite 100MF from Kyoesha Yushi Co., Ltd., Epiol TMP from Nippon Yushi Co., Ltd., and the like.

For example, when the curable composition according to an embodiment is a solvent-free curable composition, the binder resin may be included in an amount of 0.5 wt % to 10 wt %, for example 1 wt % to 5 wt %, based on the total amount of the curable composition. In this case, heat resistance and chemical resistance of the solvent-free curable composition may be improved, and storage stability of the composition may also be improved.

For example, when the curable composition according to an embodiment is a curable composition including a solvent, the binder resin may be included in an amount of 1 wt % to 30 wt %, for example 3 wt % to 20 wt %, based on the total amount of the curable composition. In this case, pattern characteristics, heat resistance and chemical resistance may be improved.

Other Additives

For stability and dispersion improvement of the quantum dot, the curable composition according to an embodiment may further include a polymerization inhibitor.

The polymerization inhibitor may include a hydroquinone-based compound, a catechol-based compound, or a combination thereof, but is not necessarily limited thereto. When the curable composition according to an embodiment further includes the hydroquinone-based compound, the catechol-based compound, or the combination thereof, room temperature crosslinking during exposure after printing (coating) the curable composition may be prevented.

For example, the hydroquinone-based compound, catechol-based compound or combination thereof may include hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O,O') aluminium, or a combination thereof, but is not necessarily limited thereto.

The hydroquinone-based compound, catechol-based compound, or combination thereof may be used in the form of a dispersion, and the polymerization inhibitor in the dispersion form may be included in an amount of 0.001 wt % to 3 wt %, for example 0.1 wt % to 2 wt % based on the total amount of the curable composition. When the polymerization inhibitor is included within the above range, the problem of aging at room temperature may be solved, and at the same time, reduction of sensitivity and surface peeling may be prevented.

In addition, the curable composition according to an embodiment may include may further include malonic acid; 3-amino-1,2-propanediol; a silane-based coupling agent; a leveling agent; a fluorine-based surfactant; or a combination thereof in order to improve heat resistance and reliability.

For example, the curable composition according to an embodiment may further include a silane-based coupling agent having a reactive substituent such as a vinyl group, a carboxyl group, a methacryloxy group, an isocyanate group, an epoxy group, and the like in order to improve close-contacting properties with a substrate.

Examples of the silane-based coupling agent may be trimethoxysilyl benzoic acid, γ-methacryl oxypropyl trimethoxysilane, vinyl triacetoxysilane, vinyl trimethoxysilane, γ-isocyanate propyl triethoxy silane, γ-glycidoxy propyl trimethoxysilane, β-epoxycyclohexyl)ethyl trimethoxy silane, and the like, and these may be used alone or in a mixture of two or more.

The silane-based coupling agent may be included in an amount of 0.01 parts by weight to 10 parts by weight based on 100 parts by weight of the curable composition. When the silane-based coupling agent is included within the range, close-contacting properties, storage capability, and the like are improved.

In addition, the curable composition may further include a surfactant, for example a fluorine-based surfactant as needed in order to improve coating properties and inhibit generation of spots, that is, improve leveling performance.

The fluorine-based surfactant may have a low weight average molecular weight of 4,000 g/mol to 10,000 g/mol, and specifically 6,000 g/mol to 10,000 g/mol. In addition, the fluorine-based surfactant may have a surface tension of 18 mN/m to 23 mN/m (measured in 0.1% polyethylene glycol monomethylether acetate (PGMEA) solution). When the fluorine-based surfactant has a weight average molecular weight and a surface tension within the ranges, leveling performance may be further improved, and excellent characteristics may be provided when slit coating as high-speed coating is applied since film defects may be less generated by preventing a spot generation during the high-speed coating and suppressing a vapor generation.

Examples of the fluorine-based surfactant may be, BM-1000®, and BM-1100® (BM Chemie Inc.); MEGAFACE F 142D®, F 172®, F 173®, and F 183® Dainippon Ink Kagaku Kogyo Co., Ltd.); FULORAD FC-135®, FULORAD FC-170C®, FULORAD FC-430®, and FULORAD FC-431®(Sumitomo 3M Co., Ltd.); SURFLON S-112®, SURFLON S-113®, SURFLON S-131®, SURFLON S-141®, and SURFLON S-145® (ASAHI Glass Co., Ltd.); and SH-28PA®, SH-190®, SH-193®, SZ-6032®, and SF-8428®, and the like (Toray Silicone Co., Ltd.); F-482, F-484, F-478, F-554 and the like from DIC Co., Ltd.

In addition, the curable composition according to an embodiment may include a silicone-based surfactant in addition to the fluorine-based surfactant. Specific examples of the silicone-based surfactant may be TSF400, TSF401, TSF410, TSF4440, and the like of Toshiba Silicone Co., Ltd., but is not limited thereto.

The surfactant may be included in an amount of 0.01 parts by weight to 5 parts by weight, for example 0.1 parts by weight to 2 parts by weight based on 100 parts by weight of the curable composition. When the surfactant is included within the ranges, foreign materials are less produced in a sprayed composition.

In addition, the curable composition according to an embodiment may further include other additives such as an antioxidant, a stabilizer, and the like in a predetermined amount, unless properties are deteriorated.

Solvent

Meanwhile, the curable composition according to an embodiment may further include a solvent.

The solvent may for example include alcohols such as methanol, ethanol, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol monomethylether acetate, propylene glycol propylether acetate, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactate esters such as methyl lactate, ethyl lactate, and the like; hydroxy acetic acid alkyl esters such as methyl hydroxyacetate, ethyl hydroxyacetate, butyl hydroxyacetate, and the like; acetic acid alkoxyalkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl ester such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; or ketonate esters such as ethyl pyruvate, and the like, and in addition, may be N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, and the like, but is not limited thereto.

For example, the solvent may be desirably glycol ethers such as ethylene glycol monoethylether, ethylene diglycolmethylethylether, and the like; ethylene glycol alkylether acetates such as ethyl cellosolve acetate, and the like; esters such as 2-hydroxy ethyl propionate, and the like; carbitols such as diethylene glycol monomethylether, and the like; propylene glycol alkylether acetates such as propylene glycol monomethylether acetate, propylene glycol propylether acetate, and the like; alcohols such as ethanol, and the like, or a combination thereof.

For example, the solvent may be a polar solvent including propylene glycol monomethylether acetate, dipropylene glycol methylether acetate, ethanol, ethylene glycoldimethylether, ethylenediglycolmethylethylether, diethylene glycoldimethylether, 2-butoxyethanol, N-methylpyrrolidine, N-ethylpyrrolidine, propylene carbonate, γ-butyrolactone, or a combination thereof.

The solvent may be included in an amount of 40 wt % to 80 wt %, for example 45 wt % to 80 wt %, based on the total amount of the curable composition. When the solvent is within the range, the solvent-type curable composition has appropriate viscosity and thus may have excellent coating property when coated in a large area through spin-coating and slit-coating.

Another embodiment provides a cured layer manufactured using the curable composition, a color filter including the cured layer, and a display device including the color filter.

One of methods of manufacturing the cured layer may include coating the curable composition on a substrate using an ink-jet spraying method to form a pattern (S1); and curing the pattern (S2).

(S1) Formation of Pattern

The curable composition may desirably be coated to be 0.5 μm to 20 μm on a substrate in an ink-jet spraying method. The ink-jet spraying method may form a pattern by spraying a single color per each nozzle and thus repeating the spraying as many times as the needed number of colors, but the pattern may be formed by simultaneously spraying the needed number of colors through each ink-jet nozzle in order to reduce processes.

(S2) Curing

The obtained pattern is cured to obtain a pixel. Herein, the curing method may be thermal curing or photocuring process. The thermal curing process may be performed at greater than or equal to 100° C., desirably, in a range of 100° C. to 300° C., and more desirably, in a range of 160° C. to 250° C. The photocuring process may include irradiating an actinic ray such as a UV ray of 190 nm to 450 nm, for example 200 nm to 500 nm. The irradiating is performed by using a light source such as a mercury lamp with a low pressure, a high pressure, or an ultrahigh pressure, a metal halide lamp, an argon gas laser, and the like. An X ray, an electron beam, and the like may be also used as needed.

The other method of manufacturing the cured layer may include manufacturing a cured layer using the aforementioned curable composition by a lithographic method as follows.

(1) Coating and Film Formation

The curable composition is coated to have a desired thickness, for example, a thickness ranging from 2 μm to 10 μm, on a substrate which undergoes a predetermined pretreatment, using a spin or slit coating method, a roll coating method, a screen-printing method, an applicator method, and the like. Then, the coated substrate is heated at a temperature of 70° C. to 90° C. for 1 minute to 10 minutes to remove a solvent and to form a film.

(2) Exposure

The resultant film is irradiated by an actinic ray such as a UV ray of 190 nm to 450 nm, for example 200 nm to 500 nm after putting a mask with a predetermined shape to form a desired pattern. The irradiating is performed by using a light source such as a mercury lamp with a low pressure, a high pressure, or an ultrahigh pressure, a metal halide lamp, an argon gas laser, and the like. An X ray, an electron beam, and the like may be also used as needed.

Exposure process uses, for example, a light dose of 500 $mJ/cm^2$ or less (with a 365 nm sensor) when a high-pressure mercury lamp is used. However, the light dose may vary depending on types of each component of the curable composition, its combination ratio, and a dry film thickness.

(3) Development

After the exposure process, an alkali aqueous solution is used to develop the exposed film by dissolving and removing an unnecessary part except the exposed part, forming an image pattern. In other words, when the alkali developing solution is used for the development, a non-exposed region is dissolved, and an image color filter pattern is formed.

(4) Post-Treatment

The developed image pattern may be heated again or irradiated by an actinic ray and the like for curing, in order to accomplish excellent quality in terms of heat resistance, light resistance, close-contacting properties, crack-resistance, chemical resistance, high strength, storage stability, and the like.

[Mode for Invention]

Hereinafter, the present invention is illustrated in more detail with reference to examples. These examples, however, are not in any sense to be interpreted as limiting the scope of the invention.

(Preparation of Surface-Modified Quantum Dots)

PREPARATION EXAMPLE

After putting a magnetic bar in a 3-necked round-bottomed flask, green quantum dot dispersion solution (InP/ZnSe/ZnS, Hansol Chemical; quantum dot solid content of 23 wt %) was put therein. The compound represented by Chemical Formula Q (a ligand) was added thereto and then, stirred at 80° C. under a nitrogen atmosphere. When a reaction was completed, after decreasing the temperature down to room temperature (23° C.), the quantum dot reaction solution was added to cyclohexane, catching precipitates. The precipitates were separated from the cyclohexane through centrifugation and then, sufficiently dried in a vacuum oven for one day, obtaining surface-modified quantum dots.

(*Synthesis of Compound represented by Chemical Formula Q: 100 g of PH-4 (Hannong Chemical Inc.) was put in a 2-neck round-bottomed flask and then, sufficiently dissolved in 300 mL of THF. 15.4 g of NaOH and 100 mL of water were injected thereinto at 0° C. and then, sufficiently dissolved, until a clear solution was obtained. A solution obtained by dissolving 73 g of para-toluene sulfonic chloride in 100 mL of THF was slowly injected thereinto at 0° C. Injection was carried out for 1 hour, and the obtained mixture was stirred at room temperature for 12 hours. When a reaction was completed, an excessive amount of methylene chloride was added thereto and then, stirred, and a $NaHCO_3$ saturated solution was added thereto, which was followed by extraction, titration, and water removal. After removing the solvent, the residue was dried in a dry oven for 24 hours. 50 g of the dried product was put in a 2 necked round-bottomed flask and sufficiently stirred in 300 mL of ethanol. Subsequently, 27 g of thiourea was added thereto and dispersed therein and then, refluxed at 80° C. for 12 hours. Then, an aqueous solution prepared by dissolving 4.4 g of NaOH in 20 mL of water was injected thereinto, while further stirred for 5 hours, an excessive amount of methylene chloride was added thereto, and then, a hydrochloric acid aqueous solution was added thereto, which was sequentially followed by extraction, titration, water removal, and solvent removal. The obtained product was dried in a vacuum oven for 24 hours, obtaining a compound represented by Chemical Formula Q.)

[Chemical Formula Q]

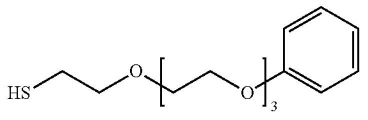

(Preparation of Curable Compositions)

The curable compositions according to Examples 1 to 9 and Comparative Examples 1 to 6 were prepared based on each of the following components.

(A) Quantum Dots

Surface-modified green quantum dots prepared from the above preparation example (B) Polymerizable Compound (B-1) a compound represented by Chemical Formula 1-1 (viscosity: 4.3 cPs, vapor pressure: $2.9\times10^{-3}$ torr)

[Chemical Formula 1-1]

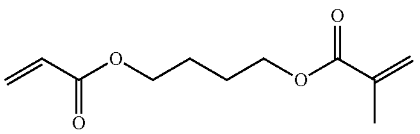

(B-2) a compound represented by Chemical Formula 1-2 (viscosity: 5.5 cPs, vapor pressure: $1\times10^{-3}$ torr)

[Chemical Formula 1-2]

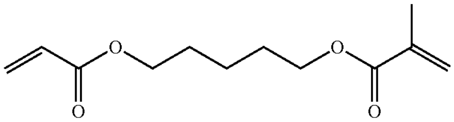

(B-3) a compound represented by Chemical Formula 1-3 (viscosity: 6.15 cPs, vapor pressure: $3.6\times10^{-4}$ torr)

[Chemical Formula 1-3]

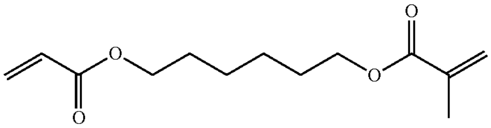

(B-4) a compound represented by Chemical Formula 1-4 (viscosity: 3.9 cPs, vapor pressure: $3\times10^{-3}$ torr)

[Chemical Formula 1-4]

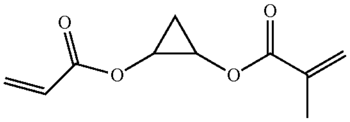

(B-5) a compound represented by Chemical Formula 1-5 (viscosity: 4.5 cPs, vapor pressure: $1.9\times10^{-3}$ torr)

[Chemical Formula 1-5]

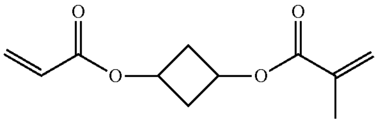

(B-6) a compound represented by Chemical Formula 1-6 (viscosity: 5.3 cPs, vapor pressure: $1.2\times10^{-3}$ torr)

[Chemical Formula 1-6]

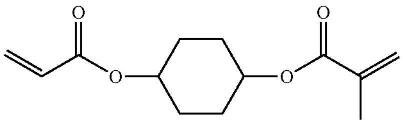

(B-7) a compound represented by Chemical Formula 1-7 (viscosity: 4.1 cPs, vapor pressure: $7.8\times10^{-4}$ torr)

[Chemical Formula 1-7]

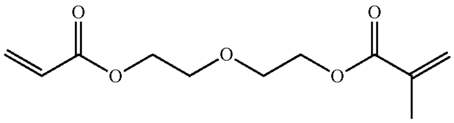

(B-8) a compound represented by Chemical Formula 1-8 (viscosity: 5.4 cPs, vapor pressure: $9.5\times10^{-5}$ torr)

[Chemical Formula 1-8]

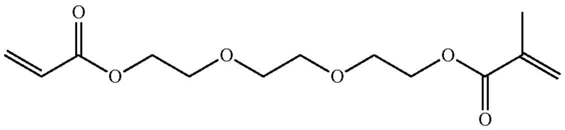

(B-9) a compound represented by Chemical Formula 1-9 (viscosity: 6.1 cPs, vapor pressure: $5\times10^{-6}$ torr)

[Chemical Formula 1-9]

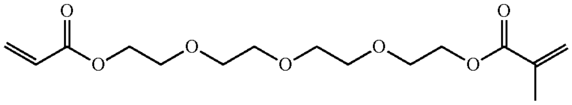

(B-10) a compound represented by Chemical Formula C-1 (viscosity: 6.2 cPs, vapor pressure: $1\times10^{-3}$ torr)

[Chemical Formula C-1]

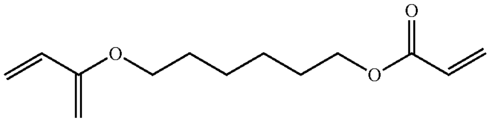

(B-11) a compound represented by Chemical Formula C-2 (viscosity: 4.5 cPs, vapor pressure: $8\times10^{-3}$ torr)

[Chemical Formula C-2]

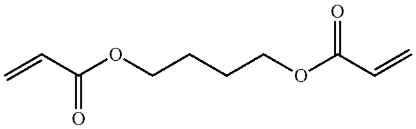

(B-12) a compound represented by Chemical Formula C-3 (viscosity: 5.4 cPs, vapor pressure: $2.85\times10^{-3}$ torr)

[Chemical Formula C-3]

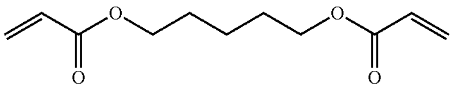

(B-13) a compound represented by Chemical Formula C-4 (viscosity: 4.45 cPs, vapor pressure: $1.85\times10^{-3}$ torr)

[Chemical Formula C-4]

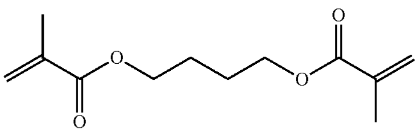

(B-14) a compound represented by Chemical Formula C-5 (viscosity: 5.27 cPs, vapor pressure: $3.7\times10^{-4}$ torr)

[Chemical Formula C-5]

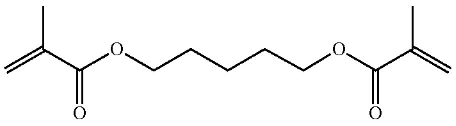

(B-15) a compound represented by Chemical Formula C-6 (viscosity: 6.4 cPs, vapor pressure: $1.3\times10^{-4}$ torr)

[Chemical Formula C-6]

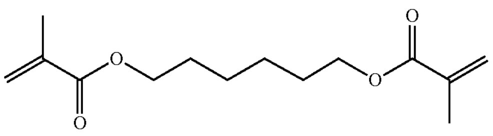

(C) Photopolymerization Initiator

TPO-L (Polynetron)

(D) Light Diffusing Aquent

Titanium dioxide dispersion (rutile type $TiO_2$; D50 (180 nm))

(E) Polymerization Inhibitor

Methylhydroquinone (TOKYO CHEMICAL Co., Ltd.)

Examples 1 to 9, Comparative Examples 1 to 3, and Reference Examples 1 to 3

Specifically, the surface-modified quantum dots prepared in the preparation example were mixed with a curable monomer in the same weight ratio and then, stirred for 12 hours. Herein, a polymerization inhibitor was added thereto and then, stirred for 5 minutes. Subsequently, a photoinitiator was added thereto, and then, a light diffusing agent was added thereto.

(Taking Example 1 as an example, 40 g of the surface-modified green quantum dots and 40 g of a compound represented by Chemical Formula 1-1 as the curable monomer were mixed and stirred to prepare quantum dot dispersion, 12.5 g of another curable monomer represented by Chemical Formula 1-1 and 0.5 g of the polymerization inhibitor were added thereto and then, stirred for 5 minutes, and subsequently, 3 g of the photoinitiator and 4 g of the light diffusing agent were added thereto and then, stirted, preparing a curable composition.)

Specific compositions are shown in Tables 1 and 2.

TABLE 1

(unit: wt %)

| | Quantum dot | Curable monomer B-1 | B-2 | B-3 | B-4 | B-5 | B-6 | B-7 | B-8 | B-9 | Polymerization inhibitor | Photo-initiator | Light diffusing agent |
|---|---|---|---|---|---|---|---|---|---|---|---|---|---|
| Ex. 1 | 40 | 52.5 | — | — | — | — | — | — | — | — | 0.5 | 3 | 4 |
| Ex. 2 | 40 | — | 52.5 | — | — | — | — | — | — | — | 0.5 | 3 | 4 |
| Ex. 3 | 40 | — | — | 52.5 | — | — | — | — | — | — | 0.5 | 3 | 4 |
| Ex. 4 | 40 | — | — | — | 52.5 | — | — | — | — | — | 0.5 | 3 | 4 |
| Ex. 5 | 40 | — | — | — | — | 52.5 | — | — | — | — | 0.5 | 3 | 4 |
| Ex. 6 | 40 | — | — | — | — | — | 52.5 | — | — | — | 0.5 | 3 | 4 |
| Ex. 7 | 40 | — | — | — | — | — | — | 52.5 | — | — | 0.5 | 3 | 4 |
| Ex. 8 | 40 | — | — | — | — | — | — | — | 52.5 | — | 0.5 | 3 | 4 |
| Ex. 9 | 40 | — | — | — | — | — | — | — | — | 52.5 | 0.5 | 3 | 4 |

TABLE 2

(unit: wt %)

| | Quantum dot | Curable monomer B-10 | B-11 | B-12 | B-13 | B-14 | B-15 | Polymerization inhibitor | Photo-initiator | Light diffusing agent |
|---|---|---|---|---|---|---|---|---|---|---|
| Comp. Ex. 1 | 40 | 52.5 | — | — | — | — | — | 0.5 | 3 | 4 |
| Comp. Ex. 2 | 40 | — | 52.5 | — | — | — | — | 0.5 | 3 | 4 |

TABLE 2-continued (unit: wt %)

| | Quantum dot | Curable monomer B-10 | B-11 | B-12 | B-13 | B-14 | B-15 | Polymerization inhibitor | Photo-initiator | Light diffusing agent |
|---|---|---|---|---|---|---|---|---|---|---|
| Comp. Ex. 3 | 40 | — | — | — | — | — | 52.5 | 0.5 | 3 | 4 |
| Ref. Ex. 1 | 40 | — | — | 52.5 | — | — | — | 0.5 | 3 | 4 |
| Ref. Ex. 2 | 40 | — | — | — | 52.5 | — | — | 0.5 | 3 | 4 |
| Ref. Ex. 3 | 40 | — | — | — | — | 52.5 | — | 0.5 | 3 | 4 |

Evaluation 1: Evaluation of Ink Viscosity and Volatility

Each curable composition according to Examples 1 to 9, Comparative Examples 1 to 3, and Reference Examples 1 to 3 was measured with respect to viscosity at 25° C. by using a viscometer (RV-2 spins, 23 rpm, D-II made by Brookfield Engineering Laboratories, Inc.), and the results are shown in Table 3, and in addition, after ink-jetting each curable compositions in a pixel having barrier ribs, a thickness reduction rate of each single film was measured by using a 3D optical microscope (VK-9710 color 3D laser microscope, Keyence Corp.) to calculate a film residue ratio, and the results are shown in Table 3. In Table 3, the higher a film residue ratio, the lower volatility.

TABLE 3

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Viscosity (cPs) | 20.3 | 23.2 | 25.3 | 23.6 | 24.2 | 25.1 | 25.3 | 25.8 | 26.5 |
| Film residue ratio (%) | 85 | 92 | 96 | 85 | 88 | 92 | 85 | 90 | 95 |

| | Comp. Ex. 1 | Comp. Ex. 2 | Comp. Ex. 3 | Ref. Ex. 1 | Ref. Ex. 2 | Ref. Ex. 3 |
|---|---|---|---|---|---|---|
| Viscosity (cPs) | 25.5 | 21 | 26 | 23.4 | 21.8 | 23.6 |
| Film residue ratio (%) | 85 | 73 | 88 | 82 | 80 | 83 |

Referring to Table 3, the curable compositions according to Examples 1 to 9, Reference Examples 1 to 3, and Comparative Examples 1 to 3 all had low viscosity, but when the curable compositions having similar viscosity were compared, the curable compositions according to Examples 1 to 9 exhibited a higher film residue ratio than those of the curable compositions according to Reference Examples 1 to 3 and Comparative Examples 1 to 3 and thus much improved volatility. In other words, the curable composition according to an embodiment had low viscosity and simultaneously, exhibited improved volatility.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A curable composition, comprising:

(A) quantum dots; and (B) a curable monomer represented by Chemical Formula 1:

[Chemical Formula 1]

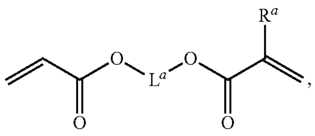

wherein, in Chemical Formula 1, $R^a$ is a substituted or unsubstituted C1 to C20 alkyl group, and $L^a$ is a substituted or unsubstituted C3 to C6 cycloalkylene group or a linking group represented by Chemical Formula 2,

[Chemical Formula 2]

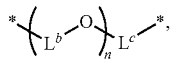

and wherein, in Chemical Formula 2, $L^b$ and $L^c$ are each independently a substituted or unsubstituted C1 to C8 alkylene group, and n is an integer of 2 to 3, the curable monomer having a viscosity measured at 25° C. of less than 6.2 cps, a vapor pressure of $1\times10^{-6}$ torr to $3\times10^{-3}$ torr, and a film residue ratio of 88% to 95%.

2. The curable composition of claim 1, wherein the curable monomer has a viscosity measured at 25° C. of greater than or equal to 3 cps and less than 6.2 cps.

3. The curable composition of claim 1, wherein the curable monomer has an asymmetric structure.

4. The curable composition of claim 1, wherein, in Chemical Formula 2, $L^b$ and $L^c$ are each independently a substituted or unsubstituted C1 to C3 alkylene group.

5. The curable composition of claim 1, wherein in Chemical Formula 1, $L^a$ is an unsubstituted C3 to C6 cycloalkylene group, or a linking group represented by Chemical Formula 2, and in Chemical Formula 2, $L^b$ and $L^c$ are each independently an unsubstituted C1 to C6 alkylene group.

6. The curable composition of claim 1, wherein the curable monomer is represented by any one of Chemical Formula 1-4 to Chemical Formula 1-9:

[Chemical Formula 1-4]

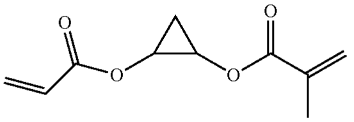

[Chemical Formula 1-5]

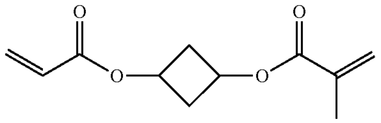

[Chemical Formula 1-6]

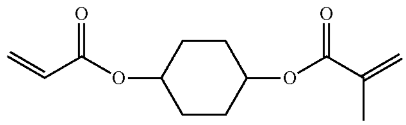

[Chemical Formula 1-7]

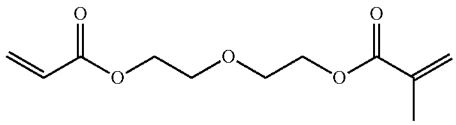

[Chemical Formula 1-8]

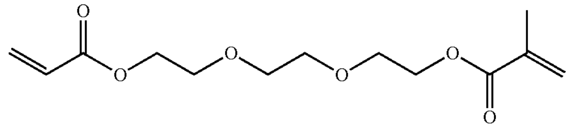

[Chemical Formula 1-9]

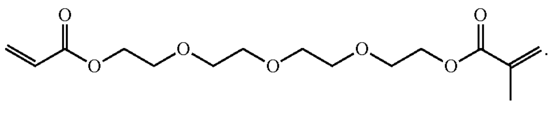

7. The curable composition of claim 1, wherein the quantum dots are surface-modified with a ligand having a polar group.

8. The curable composition of claim 7, wherein the ligand having the polar group is represented by any one of Chemical Formula 3 to Chemical Formula 16:

[Chemical Formula 3]

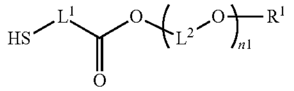

[Chemical Formula 4]

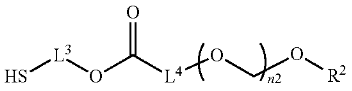

[Chemical Formula 5]

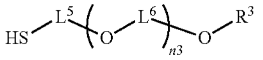

[Chemical Formula 6]

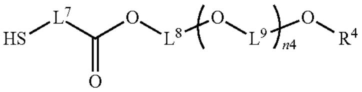

[Chemical Formula 7]

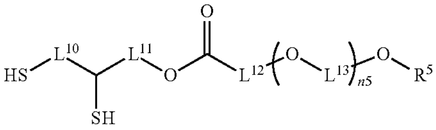

[Chemical Formula 8]

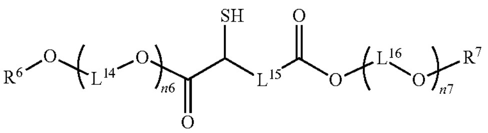

wherein, in Chemical Formula 3 to Chemical Formula 8, $R^1$ to $R^7$ are each independently a substituted or unsubstituted C1 to C10 alkyl group or a substituted or unsubstituted C6 to C20 aryl group, $L^1$ to $L^{16}$ are each independently a substituted or unsubstituted C1 to C10 alkylene group, and n1 to n7 are each independently an integer of 0 to 10,

[Chemical Formula 9]

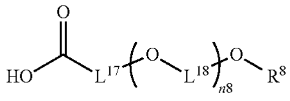

[Chemical Formula 10]

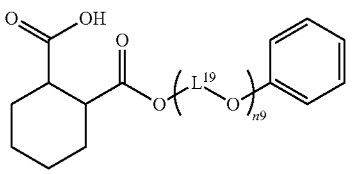

[Chemical Formula 11]

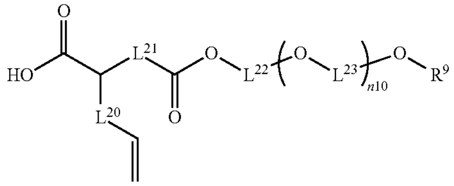

wherein, in Chemical Formula 9 to Chemical Formula 11, $R^8$ and $R^9$ are each independently a substituted or unsubstituted C1 to C10 alkyl group, $L^{17}$ to $L^{23}$ are each independently a substituted or unsubstituted C1 to C10 alkylene group, and n8 to n10 are each independently an integer of 0 to 10,

[Chemical Formula 12]

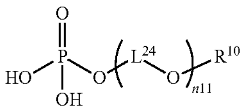

[Chemical Formula 13]

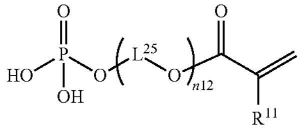

[Chemical Formula 14]

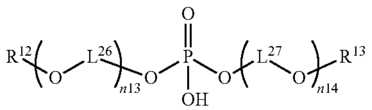

[Chemical Formula 15]

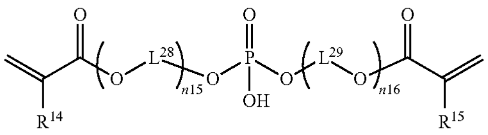

wherein, in Chemical Formula 12 to Chemical Formula 15, $R^{10}$ to $R^{15}$ are each independently a hydrogen atom or a substituted or unsubstituted C1 to C10 alkyl group, $L^{24}$ to $L^{29}$ are each independently a substituted or unsubstituted C1 to C10 alkylene group, and n11 to n16 are each independently an integer of 0 to 10,

[Chemical Formula 16]

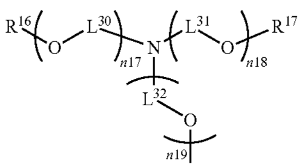

wherein, in Chemical Formula 16, $R^{16}$ to $R^{18}$ are each independently a substituted or unsubstituted C1 to C10 alkyl group, $L^{30}$ to $L^{32}$ are each independently a substituted or unsubstituted C1 to C10 alkylene group, and n17 to n19 are each independently an integer of 0 to 10.

9. The curable composition of claim 1, wherein the curable composition is a solvent-free curable composition.

10. The curable composition of claim 9, wherein the solvent-free curable composition comprises, based on the total amount of the solvent-free curable composition, 5 wt % to 60 wt % of the quantum dots; and 40 wt % to 95 wt % of the curable monomer.

11. The curable composition of claim 1, wherein the curable composition further comprises a polymerization initiator, a light diffusing agent, a polymerization inhibitor, or a combination thereof.

12. The curable composition of claim 11, wherein the light diffusing agent comprises barium sulfate, calcium carbonate, titanium dioxide, zirconia, or a combination thereof.

13. The curable composition of claim 1, wherein the curable composition further comprises a solvent.

14. The curable composition of claim 13, wherein the curable composition comprises 1 wt % to 40 wt % of the quantum dots; 1 wt % to 20 wt % of the curable monomer; and 40 wt % to 80 wt % of the solvent based on the total weight of the curable composition.

15. The curable composition of claim 1, wherein the curable composition further comprises malonic acid; 3-amino-1,2-propanediol; a silane-based coupling agent; a leveling agent; a fluorine-based surfactant; or a combination thereof.

16. A cured layer manufactured by using the curable composition of claim 1.

17. A color filter comprising the cured layer of claim 16.

18. A display device comprising the color filter of claim 17.

19. The curable composition of claim 1, wherein the curable monomer is an asymmetric di-functional monomer having one acrylate group and one methacrylate group, and wherein the monomer has a molecular weight of less than 220 g/mol and a viscosity of less than 6.2 cP at 25° C.

20. The curable composition of claim 1, wherein the quantum dots have a maximum fluorescence emission wavelength in the range of 500 nm to 680 nm and a full width at half maximum (FWHM) of 20 nm to 50 nm.

* * * * *